United States Patent [19]
Read

[11] Patent Number: 5,778,804
[45] Date of Patent: Jul. 14, 1998

[54] FASTENING APPARATUS

[76] Inventor: Donald E. Read, 2851 N. Lake Dr., Milwaukee, Wis. 53211

[21] Appl. No.: 559,937

[22] Filed: Nov. 17, 1995

[51] Int. Cl.$^6$ .................................................. F16B 5/00
[52] U.S. Cl. .................................. 248/221.12; 248/553
[58] Field of Search ................ 248/221.11, 221.12, 248/222.41, 553; 108/153, 154, 155, 157; 312/263

[56] References Cited

U.S. PATENT DOCUMENTS

| 2,710,161 | 6/1955 | Haberstump | 248/221.12 |
| 3,491,820 | 1/1970 | Ostling | 151/41.7 |
| 4,332,205 | 6/1982 | Corl, Jr. | 108/60 |
| 4,387,872 | 6/1983 | Hogue | 248/221.11 |
| 4,603,829 | 8/1986 | Koike et al. | 248/553 |

*Primary Examiner*—Milton Nelson, Jr.
*Assistant Examiner*—Gerald A. Anderson
*Attorney, Agent, or Firm*—Joseph S. Heino

[57] ABSTRACT

A method and apparatus for fastening one component, such as a table top, to a second component, such as that which is intended to support the table top. The support component is provided with alignment and fastening members extending from it. The alignment and fastening members are functionally adapted to be received by complimentary recesses situated within the complimentary component. The extending alignment members are actuable to force movement of the table top in relation to the support component. Such movement results in engagement of the fastening members with fastening clips situated within the table top and secures the table top to the support component.

7 Claims, 2 Drawing Sheets

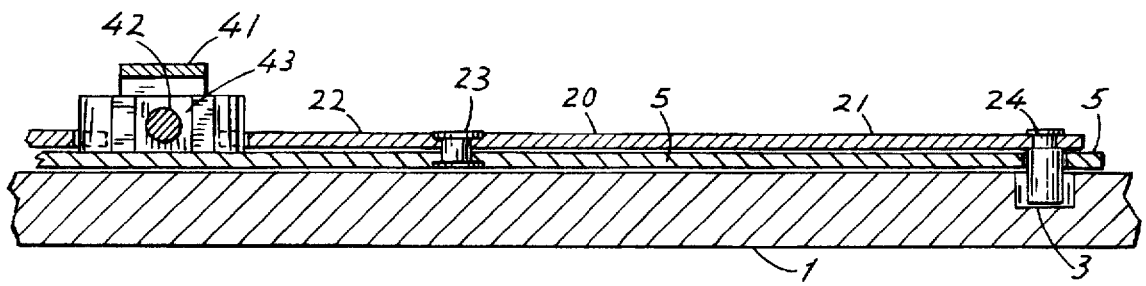
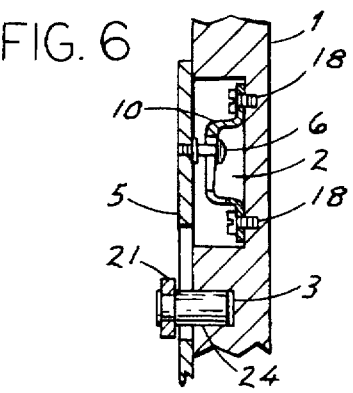
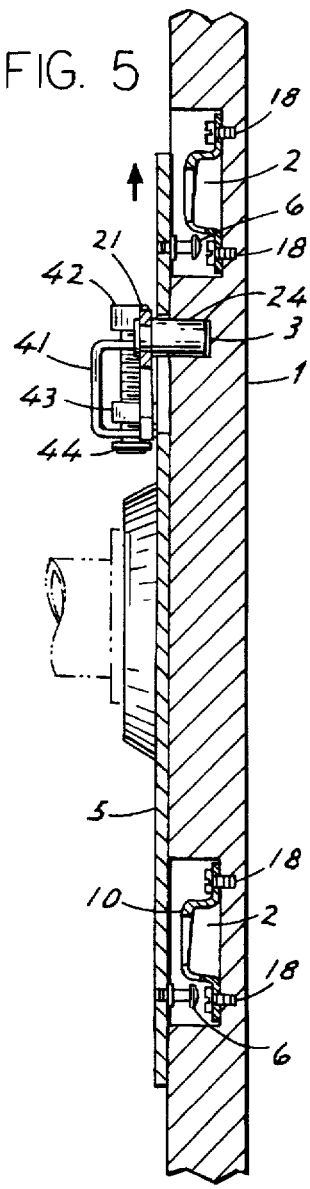
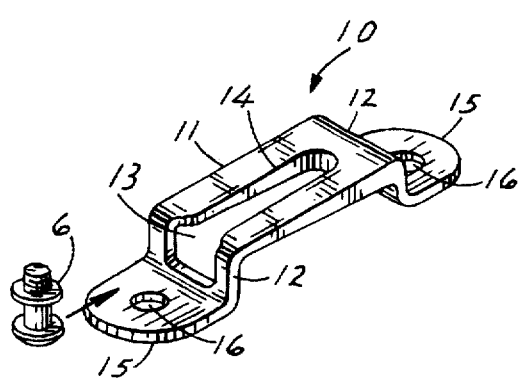

FASTENING APPARATUS

FIELD OF THE INVENTION

This invention relates generally to units which may be assembled from individual components in interlocking relationships. More particularly, it relates to a apparatus for slidably engaging and securely fastening a first component to a second component. In the preferred embodiment, it also relates to a table top which may be slidably engaged with and securely fastened to a table top support member, the table top support member being affixed to a table pedestal or other base member.

BACKGROUND OF THE INVENTION

A commonly recognized problem associated with assembled units, including tables and the like, is that it may not always be advantageous to transport or store such units in their completely assembled condition. It is, in the experience of this inventor as it relates to tables and the like, often advantageous to separate the table top from that which supports it and to assemble or attach those items to each other in the field. A problem with this approach, however, is that it is not always easy to complete the assembly task without using many small attachment pieces, i.e. screws and the like, which is time and labor intensive. Such attachment pieces may be removed when used in settings where such is not desired, i.e. institutional or correctional facility uses. Such assembly may also result in imprecise attachments and misalignment.

SUMMARY OF THE INVENTION

It is, therefore, a principal object of this invention to provide a new, useful and uncomplicated method and apparatus for fastening one component, such as a table top, to a second component, such as that which is intended to support the table top, and which requires only a minimal number of elements and which requires only a minimal number of steps to assemble and to disassemble the apparatus in the field. It is another object of this invention to provide such a method and device which provides secure fastening means and which frustrates disassembly or removal when such is not desired or required.

The present invention has obtained these objects. It provides for a support member which has alignment and fastening members extending from it which are functionally adapted to be received by complimentary recesses situated within a complimentary member, such as a table top. The extending alignment members are actuable to force movement of the table top in relation to the support member. Such movement results in engagement of the fastening members with fastening clips situated within the table top and secures the table top to the support member. The foregoing and other features of the method and apparatus of the present invention will be further apparent from the description which follows.

BRIEF DESCRIPTION OF THE DRAWINGS

FIG. 4 is a further enlarged front elevational view taken along line 4—4 of FIG. 2.

FIG. 5 is an enlarged side elevational view taken along line 5—5 of FIG. 1 and showing details of the retention clips used in the device of the present invention.

FIG. 6 is an enlarged side elevational view of one of the retention clips shown in FIG. 5 but showing the fastening plate and a table top in fastened relationship.

FIG. 7 is a perspective view of the retention clip shown in FIG. 6.

DETAILED DESCRIPTION

Figure 1:
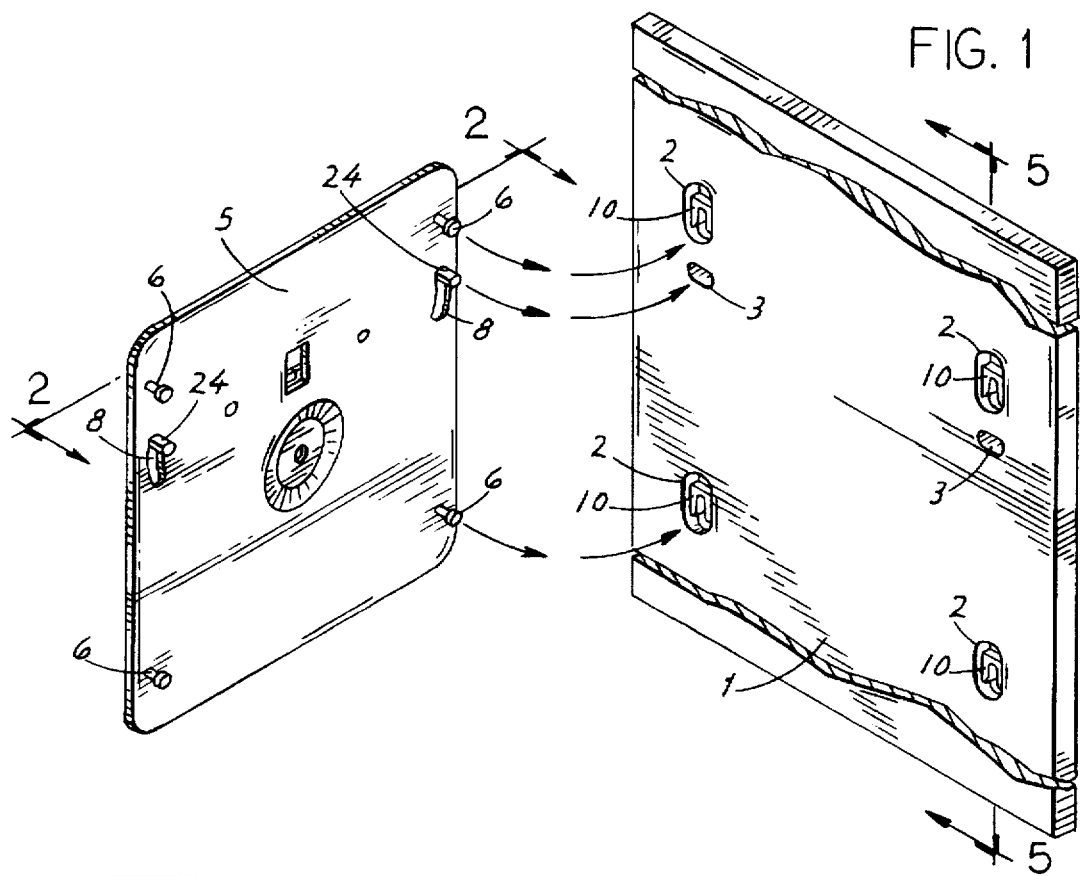
FIG. 1 is a perspective view of the fastening device of the present invention as used with a table top and showing the top surface of a fastening plate and the bottom surface of a table top into which the fastening device is integrated.

Referring now to the drawings in detail, FIG. 1 shows the top surface of a table top fastening plate 5 constructed in accordance with the device of the present invention. It also shows the bottom surface of a table top 1 to which the plate 5 is to be fastened.

The bottom surface of the table top 1 has a plurality of recesses defined in it. In the preferred embodiment, four of these are fastener recesses 2 and two are alignment recesses 3. The alignment recesses 3 comprise somewhat eccentric holes, the significance of which will become more apparent further into this description.

The top surface of the fastening plate 5 has a plurality of members extending from it. These members roughly correspond in location to the recesses defined in the bottom surface of the table top 1. In the preferred embodiment, four of these members are screw heads 6 which roughly correspond in position to the four fastener recesses 2 defined within the bottom surface of the table top 1. Two other members are pins 24 which roughly correspond in position to the alignment recesses 3 defined within the bottom surface of the table top 1.

Situated within each of the fastener recesses 2 defined within the bottom surface of the table top 1 is a retention clip, generally identified 10. See FIGS. 6 and 7. In the preferred embodiment, the retention clip 10 is generally of the type which is described in U.S. Pat. No. 3,491,820 to Ostling. The retention clip 10 includes a raised center section 11 which is supported by legs 12 extending from securing flanges 15. The clip 10 is secured within the recess 2 by means of screws 18 tightened through holes 16 located in each of the flanges 15. A slot 14 is formed within the raised center section 11 of the clip 10 which is provided with an opening 13 at one end thereof. The thickness of the clip center section 11 is configured such that a wedge or a wedging surface is formed within that section 11. This wedge or wedging surface can be formed, respectively, by varying the thickness of the clip center section 11 or by forming the outer edges of the slot 14 to form an artificial taper, either of which can be utilized in the device of the present invention and are mere design alternatives. Of importance is that the opening 13 defined at one end of the slot 14 be functionally adapted to receive the head of a screw 6 such that the screw head 6 is drawn downwardly along the clip center section 11 when the screw head 6 is moved along the clip 10. See FIGS. 6 and 7.

As previously described, the position of the alignment recesses 3 defined within the bottom surface of the table top 1 correspond roughly to the alignment pins 24 which extend from the top surface of the fastening plate 5. See FIGS. 1 and 4. The alignment pins 24 extend through a pair of arcuate slots 8 defined within the fastening plate 5. See FIG. 2. The alignment recesses 3 are somewhat eccentric to accommodate the slight sideways movement made by the alignment pins 24 when they pass through the arcuate paths of the slots 8. Each slot 8 is a mirror image of the other for reasons which will become more apparent. Each alignment pin 24 is attached, at the bottom side of the fastening plate 5, to the distal end 21 of a lever arm 20. Towards the opposite end 22, and which will be considered the proximal end, of the lever arm 20 is a rotation pin 23 about which the lever arm 20 may rotate. The rotation pin 23 is fixed in its position along the bottom of the fastening plate 5.

Also situated in fixed position on the bottom of the fastening plate 5 is an actuator assembly generally identified 40. See FIG. 2. The actuator assembly 40 includes a screw holder frame 41, a hex socket head screw 42 and a load sharing nut 43. The load sharing nut 43 is really a "force splitting" means as well as a drive means which is situated within the holder frame 41 and which is threaded onto the screw 42. The screw 42 is held in place by an end nut 44 which is welded or otherwise fastened to the end of the screw 42. Although the screw 42 is held in place within the frame 41 in the preferred embodiment, it is possible to formulate other design alternatives for holding the screw 42 in place. One would be to simply stamp end fittings into the fastening plate 5 and drill aligned holes through the end fittings. In either situation, the load sharing nut 43 is carried along the threads of the screw 42 and in contact with notches situated at the proximal end 22 of each of the lever arms 20. The screw 42 is rotated by means of a rounded hex head driver 45. See FIG. 3. The rounded edges of the driver 45 allows for some flexibility in the angle at which the driver 45 can approach the head of the screw 42.

Figure 2:
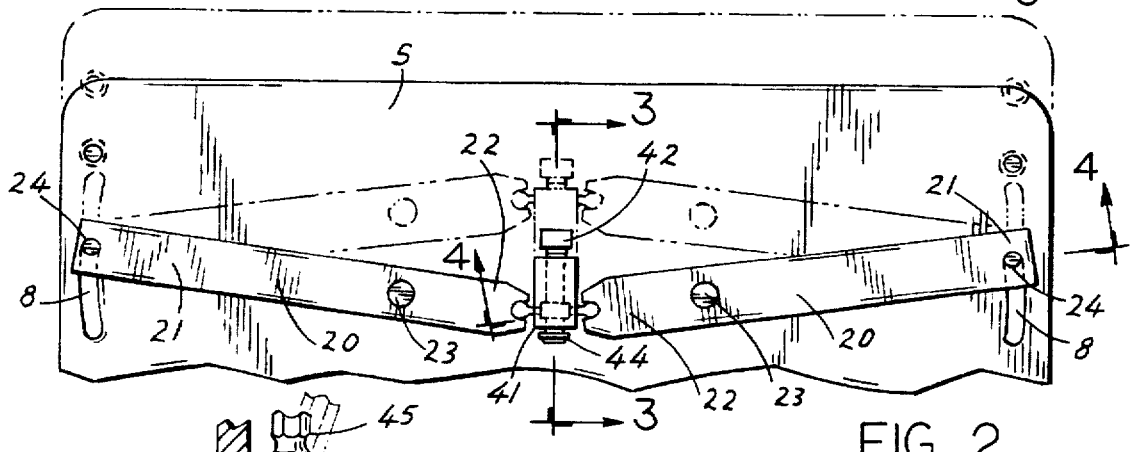
FIG. 2 is an enlarged partial bottom plan view of the fastening plate shown in FIG. 1.
Figure 3:
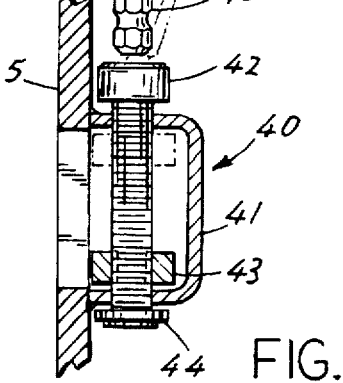
FIG. 3 is a further enlarged side elevational view taken along line 3—3 of FIG. 2.

In application, the fastening plate 5 is affixed to a pedestal or some other form of support (not shown) for the plate 5 such that the alignment pins 24 and the fastening screws 6 face upwardly from the plate 5. The alignment pins 24 are situated in the arcuate slots 8 in the pre-fastened position as shown in FIGS. 1 and 2. The table top 1 is then situated on top of the plate 5 with the alignment pins 24 engaging the respective alignment recesses 3 situated within the bottom of the table top 1 and with the fastening screws 6 engaging the respective fastening recesses 2 likewise situated within the bottom of the table top 1. See FIGS. 5 and 6. With these members and recesses in general alignment and engagement, the actuator screw 42 is rotated by use of the hex head wrench 46. As the actuator screw 42 is rotated, the load sharing nut 43 forces the proximal end 22 of each lever arm 20 to rotate about their respective rotation pins 23. This, in turn, forces the distal end 21 of each lever arm to likewise rotate and move the alignment pin 24 along the arcuate slots 8 situated in the fastening plate 5. See phantom view shown in FIGS. 2 and 3. This arrangement also results in what this inventor would term "torque multiplication." That is, a force applied to the screw 42 is effectively split by the load sharing nut 43 which rotates the distal end 21 of each of the lever arms 20 about the rotation pin 23. The location of the rotation pin 23 toward one end of the lever arm 20 results in this torque multiplication.

With each of the alignment pins 24 being fixed in relation to the alignment recess 3 situated within the table top 1, movement of the alignment pines 24 along the arcuate slots 8 results in the entire table top 1 being moved in one direction along the fastening plate 5. As this movement occurs, each of the fastening screw heads 6 engages the opening 13 of the clip 10 situated within each of the fastener recesses 2 and slides the screw head 6 along the wedged clip center portion 14, thus pulling the fastening plate 5 into tight planar engagement with the table top 1. See FIG. 6. To remove the table top 1, the opposite of this movement is made.

From the foregoing detailed description of the illustrated embodiment of the invention set forth herein, it will be apparent that there has been provided a new, useful and uncomplicated apparatus for fastening a table top to that which is intended to support the table top, which requires only a minimal number of elements, which requires only a minimal number of steps to assemble and to disassemble the apparatus in the field and which provides secure table top fastening means and frustrates removal when such is not desired or required.

The principles of this invention having been fully explained in connection with the foregoing, I hereby claim as my invention:

1. A fastening assembly which comprises
   a first assembly member, said first assembly member including a generally flat bottom surface,
   a second assembly member, said second assembly member including a generally flat top surface,
   means for achieving generally coplanar alignment between the flat bottom surface of the first assembly member and the flat top surface of the second assembly member, said alignment means including a plurality of alignment posts extending outwardly from the second assembly member top surface and a plurality of complimentary recesses defined within the first assembly member bottom surface, each recess being functionally adapted to receive an alignment post within it,
   means for moving the first assembly member and the second assembly member in relation to each other, said movement means including means for varying the position of the alignment posts of the second assembly member, and
   means for fastening the first assembly member to the second assembly member.

2. The fastening assembly of claim 1 wherein the movement means includes a drive mechanism, said drive mechanism including a screw-actuated load-sharing nut and a pair of symmetrically located and pivotally moveable arms, one end of each arm being movable by the load sharing nut and the opposite end of each arm being affixed to one of the alignment posts of the second assembly member.

3. The fastening assembly of claim 2 wherein the fastening means includes a plurality of complimentary fastening members attached to the top surface of the second assembly member and to the bottom surface of the first assembly member such that the first assembly member becomes fastened to the second assembly member when the movement means is actuated.

4. A fastening assembly comprising
   a first assembly member, said first assembly member including a generally flat bottom surface,
   a second assembly member, said second assembly member including a generally flat top surface,
   means for locating said first assembly member along said second assembly member, said locating means including a plurality of locating members extending upwardly from said second assembly member and a plurality of locating recesses defined within the bottom surface of said first assembly member, said recesses being complimentary to and functionally adapted to receive the upwardly extending locating members of the second assembly member,
   means for incrementally moving said first assembly member along said second assembly member, said movement means including means for incrementally moving the locating members along the top surface of the second assembly member whereby the first assembly member is moved along the second assembly member, and means for securing said first assembly member to said second assembly member.

5. The fastening assembly of claim 4 wherein said movement means further includes a pair of pivotally movable arms, one arm extending from each of the locating members, a pivot point located along each arm, means for driving each arm whereby the locating members are moved incrementally in the same direction.

6. The fastening assembly of claim 5 wherein said arm driving means includes a screw-actuated load-sharing nut which is functionally adapted to move each of the pivotally movable arms and the locating members attached to each of the arms in like incremental amounts.

7. The fastening assembly of claim 6 wherein said securing means includes a plurality of shouldered screws attached to said second assembly member, each screw having a head spaced from the surface to which the screws are secured at the end of the screw shaft, and a plurality of flexible, resilient, slotted clips complimentary to said screws and attached to said first assembly member bottom surface, each clip having a section raised above the surface to which the clip is secured and including a slot having at least one open end for receiving the head of said screw, whereby the resiliency of said clips urges said first assembly member and second assembly member tightly together when said clips and screws are engaged and said second assembly member and said first assembly member are moved in relation to each other.

* * * * *